Feb. 25, 1964 M. GUIOT 3,122,666
UNIVERSAL SYNCHRONOUS MOTOR
Filed Dec. 10, 1959 3 Sheets-Sheet 1

INVENTOR
MAURICE GUIOT
By
Wenderoth, Lind & Ponack
Attys.

Feb. 25, 1964 M. GUIOT 3,122,666
UNIVERSAL SYNCHRONOUS MOTOR
Filed Dec. 10, 1959 3 Sheets-Sheet 2

INVENTOR
MAURICE GUIOT
By
Wenderoth, Lind & Ponack
Attys.

Feb. 25, 1964   M. GUIOT   3,122,666
UNIVERSAL SYNCHRONOUS MOTOR
Filed Dec. 10, 1959   3 Sheets-Sheet 3

INVENTOR
MAURICE GUIOT
By
Wenderoth, Lind + Ponack
Attys.

United States Patent Office 3,122,666
Patented Feb. 25, 1964

3,122,666
UNIVERSAL SYNCHRONOUS MOTOR
Maurice Guiot, Paris, France, assignor to Berex
Establishment, Vaduz, Liechtenstein
Filed Dec. 10, 1959, Ser. No. 858,801
Claims priority, application France Mar. 27, 1959
3 Claims. (Cl. 310—41)

This invention relates in general to universal synchronous motors and has specific reference to a universal self-starting unidirectional synchronous motor comprising a magnetic field circuit consisting of an annular yoke and of imbricated longitudinal pole pieces emerging alternately on either side of the yoke, an annular field winding mounted between said pole pieces and the yoke, an armature or rotor consisting of a ring of ferromagnetic material of the ferrite type formed with peripheral, alternate north-south poles equal in number to said pole pieces, a shaft on which said armature is mounted for loose rotation, means for operatively connecting said armature to said shaft, said means permitting a free rotation of said armature through a certain angle relative to said shaft, and resilient means adapted to store the kinetic energy taken by the armature when the latter starts in the wrong direction for restarting same in the proper direction, said resilient means being inoperative when the armature starts from rest in the proper direction.

The motor according to this invention may be energized directly from a source of sinusoidal alternating current.

If desired, this motor may be energized from a direct-current source through the medium of a pulse generator.

In either case the velocity of rotation of the motor is independent of load and voltage variations or drops.

The arrangement provided according to this invention for starting the unidirectional synchronous motor is very simple in design and will invariably and safely rotate in the desired direction.

The synchronous motor according to this invention is advantageously applicable to the operation of windshield wipers, notably of automotive vehicles. As a matter of fact, by varying the frequency of the control pulses it is possible to adjust the velocity of rotation of the motor with a considerable flexibility or through a wide range according to the conditions of use.

In order to afford a clearer understanding of this invention and of the manner in which the same may be carried out in practice, reference will now be made to the attached drawings forming part of this specification and illustrating diagrammatically by way of example a few typical forms of embodiment of the invention. In the drawings.

Figure 1:
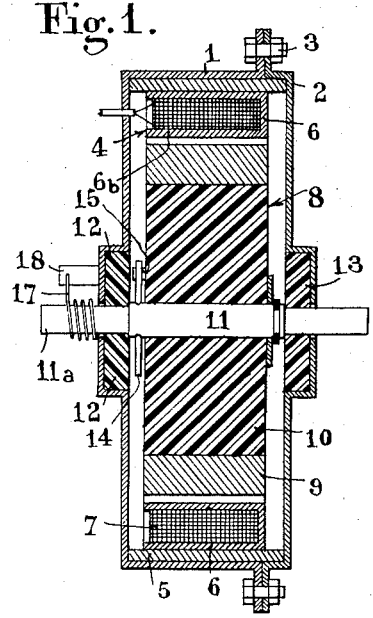
FIGURE 1 is a longitudinal section showing the universal synchronous motor of this invention.
Figure 2:
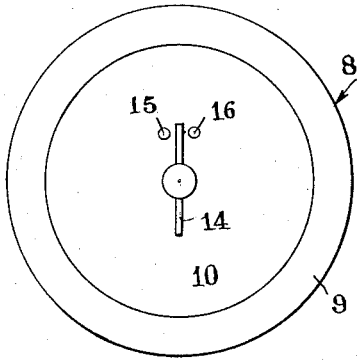
FIGURE 2 is an end view of the armature as seen from the left-hand side of FIG. 1.
Figure 3:
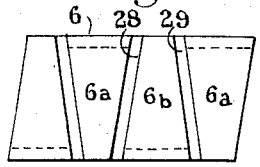
FIGURE 3 is a fragmentary developed view showing the arrangement of the stator pole-pieces.

In FIGS. 1 to 3 of the drawings, the synchronous motor according to this invention comprises two flanges or cases 1, 2 assembled by bolts 3. Housed within the flange 1 is a stator 4 comprising an outer ring 5, a yoke 6 carrying the pole pieces 6a, 6b and, internally of the yoke 6, the field winding 7.

As shown in FIG. 3, the pole pieces 6a, 6b have a trapezoidal section and are disposed in head-to-tail alternate relationship, whereby the magnetic gaps 28, 29 formed between any pole piece 6b and the two adjacent pole pieces 6a are inclined symmetrically relative to the longitudinal axis of the motor.

The pole pieces 6a, 6b extend longitudinally and consist of extensions of the two sides of yoke 6 which are bent at right angles.

The armature of rotor 6 comprises essentially a ferrite ring 9 having an even number of alternate north-south poles formed along its outer periphery. This ring 9 is carried by a central core 10 through which extends the motor shaft 11. This shaft 11 is carried in turn by a pair of bearings 12, 13 mounted in the aforesaid flanges 1 and 2 respectively.

A radial pin 14 extends through the shaft 11 and also through the gap left between a pair of stop pins 15, 16 carried by a transverse face of core 10. The armature 8 is mounted for free rotation on the shaft 11, the degree of angular clearance being subordinate to that of the radial pin 14 between the stop pins 15 and 16.

Wound on the portion 11a of shaft 11 is a coil spring 17 having one end anchored on a stud 18 rigid with the flange 1, the other end of this spring 17 being free.

The synchronous motor described hereinabove operates as follows:

Pulses or oscillations of positive and negative alternation are fed to the field winding 7 so that the direction of the field produced by this winding will change at each alternation. As a result, the pole pieces 6a, 6b will present alternate north and south polarities, thus causing a step by step shift of the poles carried by the ferrite ring 9 at each alternation.

The velocity of rotation of the armature 8 is therefore a function of the frequency of the pulses or oscillations applied to the field winding 7 and this frequency can be as low as desired.

The synchronous motor according to this invention will always start in the same direction. As a matter of fact, if at the time the field winding 7 is energized the armature 8 begins to rotate in the desired direction, the rotation will continue normally, the speed increasing gradually until the synchronism is attained.

On the other hand, if the rotor 8 tends to re-start in the opposite direction, the ferrite ring 9 will begin to rotate relative to the shaft 11, then stationary, within the angular limits permitted by the stop pins 15, 16 and the radial pin 14. Thus, when one of the stop pins, for example the stop pin 16, engages the radial pin 14, the ferrite ring 9 will subsequently carry along the shaft 11 in the opposite direction. Now, due to the direction of winding of the coil spring 17, this rotation will tighten the spring 17 and therefore increase the friction thereof, this friction increasing until the shaft 11 becomes stationary. At this time, the spring 17 will have accumulated the kinetic energy possessed by the armature 8 when the stop pin 16 had engaged the radial pin 14. From this moment on, the spring 17 will return the energy stored therein and drive the armature 8 in the proper direction. This mechanical impulse produced by the spring 17 is sufficient for causing the rotation of the armature in the proper direction.

Now a specific and particularly interesting and advantageous application of synchronous motors according to this invention will be described in connection with the operation of windshield wipers, notably for automotive vehicles.

Figure 4:
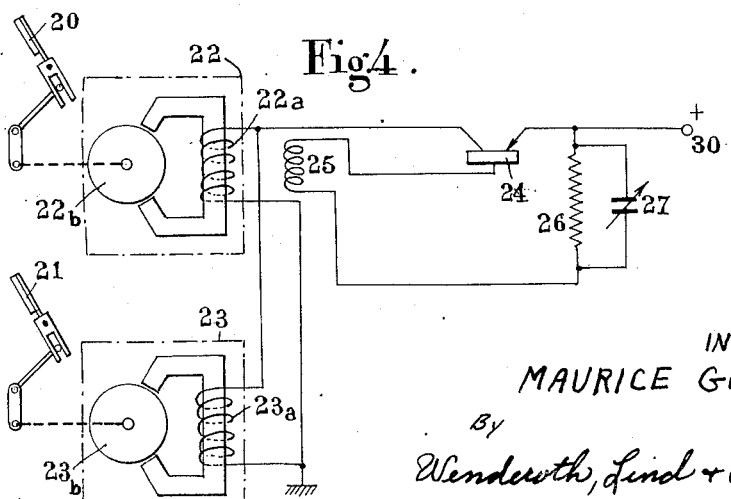
FIGURE 4 is a wiring diagram showing a typical application of the invention to the operation of a windshield wiper.

In FIG. 4 of the drawings, the windshield wiper blades 20, 21 are driven separately and respectively from synchronous motors 22, 23 of the type described hereabove with reference to FIGS. 1 to 3 of the drawings.

The windshield wipers are driven from armatures 22b, 23b of the motors through a conventional transmission adapted to transform the continuous rotational motion into a reciprocating motion. In this specific application the motors are energized from a D.C. source 30. The field windings 22a, 23a of motors 22, 23 are connected in parallel to the collector electrode of a transistor 24 operating as a pulse generator. To this end, a reaction winding 25 is coupled for example to one of the field windings such as 22a. A resistor 26 and a variable capacitor 27 in parallel therewith are connected across the terminals of this reaction winding 25 and besides the positive terminal is connected to the emitter electrode of the transistor.

This assembly operates as follows:

The transistor 24 generates a series of pulses fed in parallel to the field windings 22a, 23a so that the motors 22 and 23 will drive the windshield wiper blades 20 and 21 synchronously.

By varying the capacity of capacitor 27, the frequency of the pulses delivered by the transistor 24 and therefore the speed of rotation of the motors can be modified at will. Thus, with this arrangement, the driver can easily adapt the wiping speed to the external atmospheric conditions by reinforcing the intensity of this wiping action for example in case of heavy rain.

The synchronous motor according to this invention is also suitable for many other applications, for example for driving a pump the output of which can be varied at will by controlling the pulse frequency of the energizing current under the same conditions as set forth hereabove.

Figure 5:
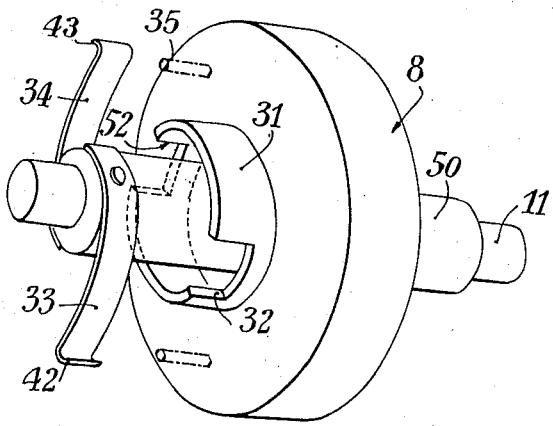
FIGURE 5 is a perspective view showing a modified embodiment of the unidirectional starting device.

A modified form of embodiment of the unidirectional starting device will now be described with reference to FIGS. 5 to 7 of the accompanying drawings.

Secured on a transverse face of the armature or rotor 8 is a socket 31 formed with diametrally opposite notches 32, 52 engaged by spring blades 33, 34 having one end secured on the sleeve 50 rigid with the motor shaft 11. This sleeve 50 is not shown in FIG. 1 in order to simplify the drawing.

Flexure stresses are applied to the spring blades 33, 34 in a direction at right angles to the longitudinal axis of the armature. The free ends 42, 43 of spring blades 32, 33 are bent to constitute a kind of hook.

Figure 6:
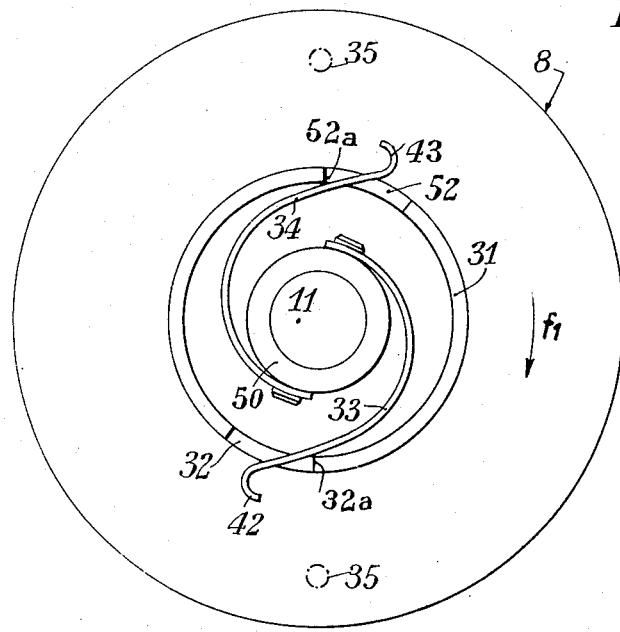
FIGURES 6 and 7 are end views of the armature as seen during the starting in either possible direction of rotation.

When the motor is started, if the armature begins to rotate in the proper direction indicated by the arrow $f_1$ of FIG. 6, the edges 32a and 52a of the aforesaid notches 32 and 52 will engage the spring blades 33, 34 respectively, and these springs will be somewhat wound around the shaft 11 without counteracting the rotation transmitted through them.

When the velocity of rotation of the armature has attained a sufficient value, the edges 32a and 52a engage the bent ends 42 and 43 of the spring blades, thus causing the motion to be transmitted to the shaft 11.

Figure 7:
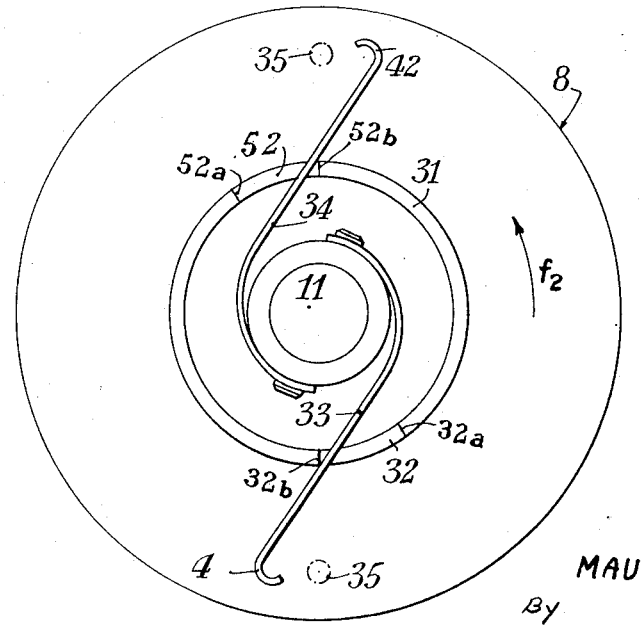

If, on the other hand, when starting the motor the armature 8 begins to rotate in the wrong direction, as indicated by the arrow $f_2$ of FIG. 7, the edges 32b and 52b of notches 32 and 52 will abut against the spring blades 33, 34 and cause same to become unwound. The bent ends 42 and 43 will thus engage studs 35 secured on the motor casing, and these studs will retard the movement of the armature until it is stationary; then, due to the inherent elasticity of the spring blades, the armature 8 will be moved back in the opposite direction.

Figure 8:
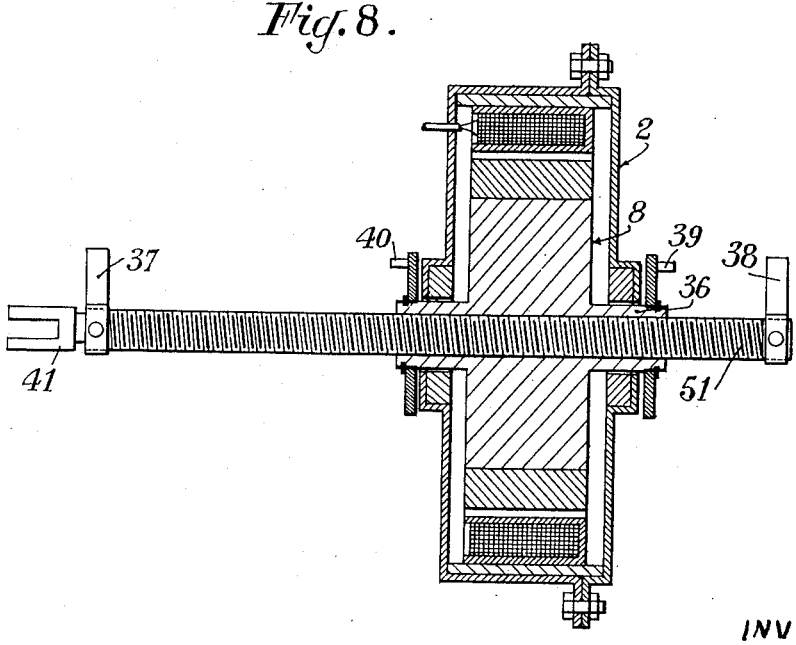
FIGURE 8 is a longitudinal section showing the application of the motor of this invention to the transformation of a rotary motion into a reciprocating linear motion.

In the form of embodiment shown in FIG. 8, the armature 8 of the motor is rigid with an internally screw-threaded socket 36 engaged by a screw-threaded rod 51 travelling in the direction of its axis at a speed consistent with the pitch of its threads. This rod 51 has secured on each of its ends resilient stop members 37, 38, and the armature 8 is adapted to cause the rotation of lugs 39, 40 externally of the casing 2.

Upon completion of each linear stroke accomplished by the shaft 11 one of the resilient stop members engages one of the lugs 39 or 40, stops the motor and the latter will then start again but in the reverse direction. A fork or yoke 41 may be fitted at one end of the shaft in order to transform the rotational motion of the motor into a linear reciprocating motion due to the instantaneous reversal of the direction of rotation of the motor without utilizing any electrical contact or switch means.

If desired, stationary stroke-limiting stops or like devices may be used.

This arrangement is suitable for operating any switching system, for example parking or traffic lamps and signals.

Of course, many modifications may be brought to the forms of embodiment described hereinabove with reference to the accompanying drawings, without however departing from the spirit and scope of the invention as set forth in the appended claims.

What I claim is:

1. A universal synchronous motor comprising,
  a housing enclosing an annular stator and having bearing means therein,
  a shaft journaled for rotation in said bearing means,
  a rotor on said shaft comprising
    a central core made of insulating material and
    a ferrite ring on the outside of said core,
  means interconnecting said core and said shaft for corotation after a free rotation of said core with reference to said shaft through a predetermined angle,
  and separable interengageable means between said shaft and said housing including
    a spring,
      said separable interengageable means being interengaged when said armature is driven in one direction whereupon said spring accumulates kinetic energy and said motor is brought to a stop,
      said spring delivering an impulse to said armature insuring operation in the opposite direction,
    said interengageable means being separable and affording free rotation when said armature is operated in the said opposite direction.

2. A universal synchronous motor comprising,
  a housing,
    an annular stator in said housing, and
    a rotor rotatable in said stator comprising,
      a ferrite ring circumscribing a central core made of electrical insulating material,
  a shaft extending centrally through and connected to said core after a free rotation of said core with reference to said shaft through a predetermined angle,
  and a coil spring wound on said shaft outwardly of said housing having
    one end anchored to said housing and having its opposite end free,
  whereby the motor will start and run in one direction, but if it starts in an opposite direction, said coil spring will tighten on said shaft, stop the shaft, and spring-bias the rotor in said one direction.

3. A universal synchronous motor comprising,
  a housing,
    an annular stator in said housing, and
    a rotor rotatable in said stator comprising,
      a ferrite ring circumscribing a central core made of electrical insulating material,
  a shaft extending centrally through and connected to said core,
    said housing having an axially extending radially notched cup-shaped socket,
      said shaft carrying a spring blade means having a hook-like end, said housing having an axially projecting stop pin located radially outwardly of said socket, said spring blade means extending radially outwardly from said shaft through the notched portion of said socket and tending to wind out of interference relation with said stop pin if said motor starts and runs in one direction, but tending to unwind with said hook-like end engaging said stop pin if said motor starts in an opposite direction to stop said motor and through engagement with said socket spring-bias the rotor in said one direction, thereby to insure operation of the motor in said one direction.

References Cited in the file of this patent

UNITED STATES PATENTS

| | | |
|---|---|---|
| 2,101,665 | Arey | Dec. 7, 1937 |
| 2,553,760 | Gille | May 22, 1951 |
| 2,633,950 | Phaneuf | Apr. 7, 1953 |
| 2,766,863 | Berg | Oct. 16, 1956 |
| 2,792,510 | De Wolf | May 14, 1957 |
| 2,818,517 | Loosjes | Dec. 31, 1957 |

FOREIGN PATENTS

| | | |
|---|---|---|
| 667,037 | Germany | Nov. 3, 1938 |
| 744,204 | Great Britain | Feb. 1, 1956 |